United States Patent [19]
Helm et al.

[11] Patent Number: 5,483,671
[45] Date of Patent: Jan. 9, 1996

[54] METHOD OF DETERMINING TRANSMISSION TIME TO TRANSMIT AN INFORMATION PACKET TO A REMOTE BUFFER

[75] Inventors: David Helm, Glendale Heights; Bill Felderman, Cary; Mario DeRango, Lake Zurich, all of Ill.

[73] Assignee: Motorola, Inc., Schaumburg, Ill.

[21] Appl. No.: 189,617

[22] Filed: Feb. 1, 1994

[51] Int. Cl.$^6$ ............................. H04B 1/00; H04Q 11/04
[52] U.S. Cl. ...................... 455/51.2; 455/51.1; 455/54.1; 455/56.1; 370/60; 370/61
[58] Field of Search ..................... 455/51.1, 51.2, 455/53.1, 56.1, 58.1, 58.2, 67.1, 54.1, 33.1; 375/107; 370/61, 60, 102

[56] References Cited

U.S. PATENT DOCUMENTS

| | | | |
|---|---|---|---|
| 4,850,032 | 7/1989 | Freeburg | 455/51 |
| 5,042,029 | 8/1991 | Hayakawa | 370/60 |
| 5,119,372 | 6/1992 | Verbeek | 370/60 |
| 5,220,676 | 6/1993 | LoGalbo et al. | 455/51.2 |
| 5,297,139 | 3/1994 | Okura et al. | 370/60 |

FOREIGN PATENT DOCUMENTS 3007681  4/1993  WIPO ................................ 455/51.2

Primary Examiner—Reinhard J. Eisenzopf
Assistant Examiner—Lee Nguyen
Attorney, Agent, or Firm—Steven G. Parmelee

[57] ABSTRACT

A method at comparator (103) of determining the depth of remote buffer (107–109), by computing the difference between the current time and a next launch time, where the next launch time is the time at which a next information packet will be transmitted by the base station (104–106) on the radio channel. The next launch time is determined by the summation of, the time to transmit a previous information packet with error correcting information on the radio channel, and the launch time of a previous information packet. The method further includes maintaining the buffer depth between thresholds such that information packets will not be provided beyond a maximum threshold and filler packets will be provided when buffer depth is less than a minimum threshold.

8 Claims, 2 Drawing Sheets

METHOD OF DETERMINING TRANSMISSION TIME TO TRANSMIT AN INFORMATION PACKET TO A REMOTE BUFFER

FIELD OF THE INVENTION

This invention relates generally to the transmission of information packets.

BACKGROUND OF THE INVENTION

Multi-site simulcast radio communication systems are well known in the art for providing wide area communications. More recently, digital simulcast radio communications systems have been developed. In such systems, digital information is formatted into information frames. Each information frame is made up of a plurality of information packets that are transported through the system infrastructure.

All simulcasted information packets in many such digital simulcast radio communication systems are processed through a comparator. The comparator receives inputs from multiple signal sources and selects an input signal source based on predetermined criteria of signal quality. The comparator then assigns a launch time to each information packet received from the selected input signal source, and transmits the information packet over an infrastructure link to at least one of a plurality of base stations, where the information packet is temporarily stored in a buffer. At the assigned launch time, error correcting information is added to the information packet and the resulting data packet is transmitted by the base stations. (The use of error correcting information to improve the reliability of transmitted information on a radio channel is well known in the art and no further elaboration need be provided here.)

For any given information packet, adding the error correcting information to the information packet prior to transmission over the radio channel typically results in a longer required transmission time on the radio channel than over the infrastructure link. For example, a particular information packet can take 20 milliseconds to transmit over the infrastructure link from the comparator to the base station, and 45 milliseconds to transmit on the radio channel. To synchronize the different transmission rates, the comparator therefore determines the launch time for an information packet as a function of both the transmission time and launch time of previous information packets transmitted on the radio channel.

Operational conditions can occur, however, that cause the launch time assignments of the comparator to fall behind present time. When the base station encounters an information packet with such a launch time assignment, the base station is unable to transmit the information packet as the launch time has already passed relative to the present time. In addition, because launch times for subsequent information packets are determined from previously assigned launch times, subsequent information packets will not be transmitted either. As a result, the user may experience a considerable loss of information.

Alternatively, operational conditions can occur where launch time assignments by the comparator are considerably ahead of present time. This causes the base stations to transmit the information packets at a significantly later time, resulting in a delay, that is particularly noticeable when audio information is transmitted.

An example of when such operational conditions can occur is when the comparator switches input signal sources during a call. At such an instance, it is probable that information packets from a previous source and a new source are not synchronized. This situation may cause the comparator to assign launch times that cause loss of information and delay of information.

Accordingly, a method of transmitting information packets from the comparator to a buffer that avoids, or at least minimizes, some of these problems is desired.

DESCRIPTION OF A PREFERRED EMBODIMENT

Figure 1:
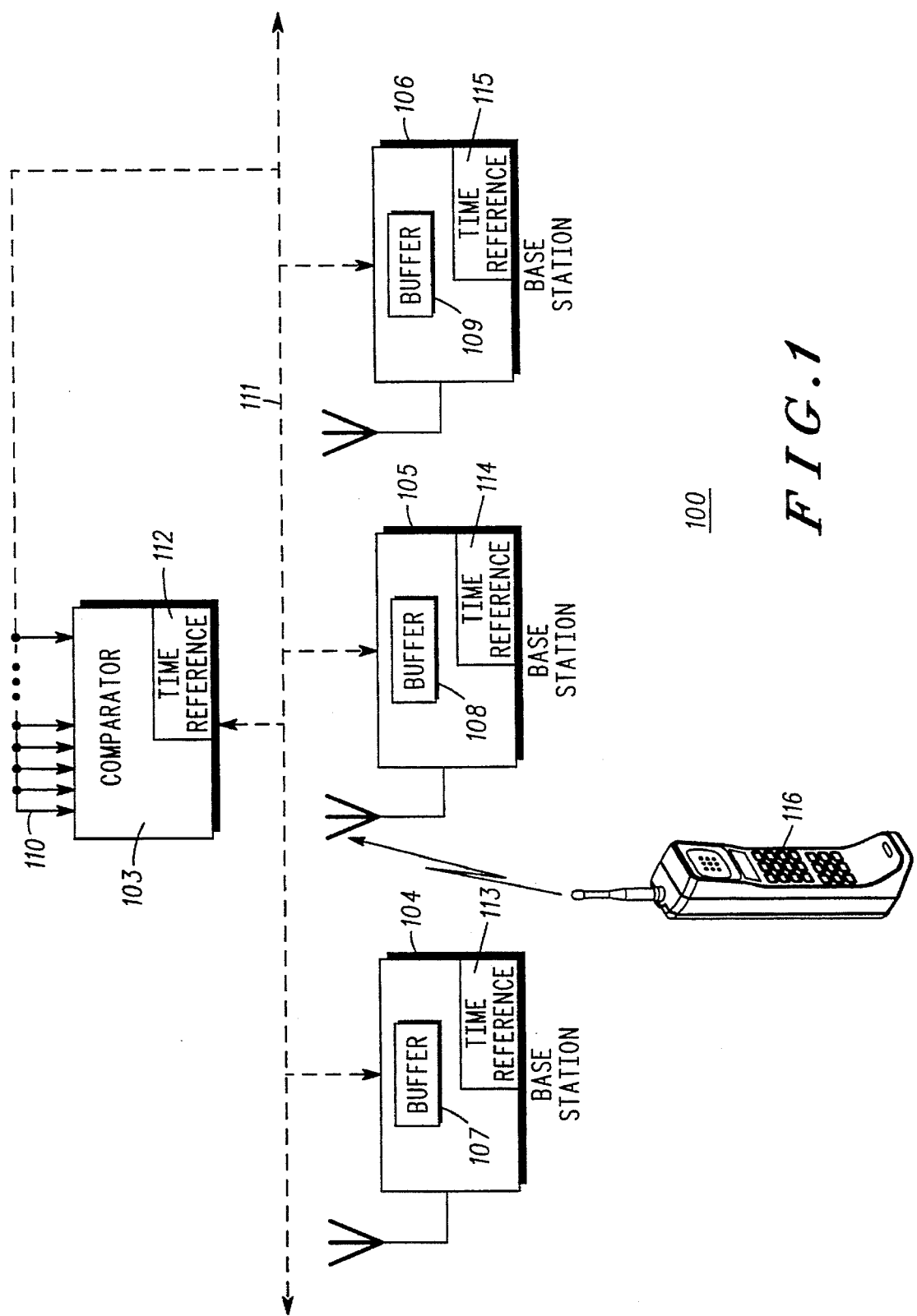
FIG. 1 depicts a functional block diagram of a part of a digital simulcast communication system in accordance with the present invention.

FIG. 1 depicts a part of a multi-site digital simulcast radio communication system (100) providing communication to wireless subscribers. Digital simulcast radio communication systems are well known in the art and one example is U.S. Ser. No. 8-023514 entitled "Method for Selecting a Best Signal in a Simulcast Communications System," filed on Feb. 26, 1993 by Grube et al. to the same assignee and incorporated herein by this reference.

This exemplary system (100) includes a comparator (103) and three base stations (104–106) that are interconnected by an infrastructure link (111). The comparator (103) receives multiple inputs (110), selects one, and provides the information packets from the selected input to the base stations (104–106) via the infrastructure link (111). (Such comparator operation is well understood in the art.) The base stations (104–106) provide a radio channel on which the information packets, with additional error correcting information and a launch time, are transmitted to a mobile subscriber unit (116). Each of the base stations (104– 106) and the comparator (103) is provided with a common time reference (112–115) to ensure system synchronization. An example of the time reference is a Global Positioning System satellite receiver. The base stations (104–106) each include a buffer (107–109) to provide temporary storage of the information packets prior to transmission at the designated launch time, and transceivers which provide at least one radio channel. The buffer (107–109) is a memory device and may include RAM, programmable memory or any other means of storing digital information.

The above described communication system represents a known hardware configuration. The comparator comprises, however, a programmable platform that can be configured to operate as described below in accordance with the invention.

During a call, when a user provides information to the subscriber unit (116), the information is digitized. The digital bits are formatted into information packets that are transmitted on a radio channel. The information packets are received by at least one of the base stations (104–106) and transported via the infrastructure link (111) to at least one of the multiple inputs (110). The comparator (103) selects one of the inputs (110) based on a predetermined set of criteria that may include signal quality or signal strength.

Figure 2:
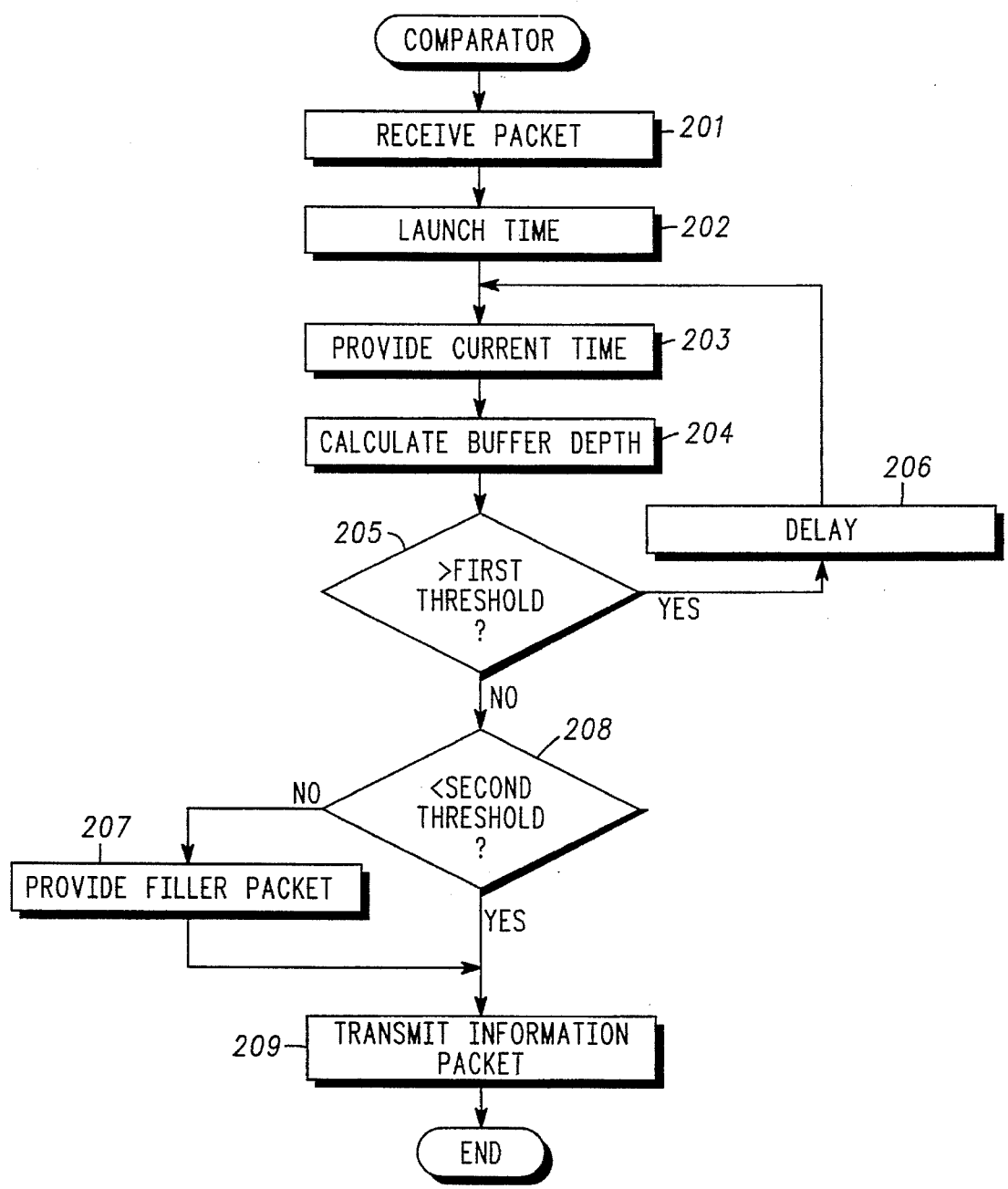
FIG. 2 depicts a flow diagram detailing operation in accordance with the present invention.

Referring now to FIG. 2, when an information packet from the selected input is received (201) by the comparator, a predetermined launch time (202) is assigned to the information packet. The predetermined launch time for a first information packet during a call can be a fixed duration such as 100 milliseconds, but for subsequent information packets, the launch time is determined with reference to the launch time and transmission time of previous information packets. For example, to determine the launch time of a second information packet, the time to transmit the first information packet with error correcting information on the radio channel is calculated and added to the launch time of the first information packet. The comparator then determines the current time (203) from the time reference.

Buffer depth is the time required to transmit the present contents of the buffer on the radio channel and provides an indication of the amount of delay in the transmission of the information packet on the radio channel. Buffer depth is determined by calculating (204) the difference between current time and the predetermined launch time of the next information packet, both as previously determined.

With this buffer status condition so determined, the process then determines if buffer depth is less than a first threshold (205) and greater than a second threshold (208) then the information packet is transmitted (209) to the buffer. If buffer depth is less than the first threshold (205) and less than the second threshold (208) then a filler packet is provided (207) and transmitted (209) to the buffer. The filler packet does not contain any user information but allows the base stations to maintain a continuous bit stream on the radio channel. The filler packet can, however, be used to provide control information. Typically during a call, filler packets are provided by the comparator when the radio channel is established and information packets are not received by the comparator. An example is at the start of a call between the time when a user has been granted a radio channel and the time when the user provides information.

The thresholds (205 and 208) ensure that the buffer depth is maintained between predetermined maximum and minimum limits. The second threshold (208) is set at a value that will allow only a minimal number of filler packets to be stored in the buffer. The minimal number determines the delay which will be imposed on the information packet when it arrives at the comparator before transmission on the radio channel. Typical values for the first threshold (205) is 150 milliseconds and for the second threshold (208) is 100 milliseconds.

If, however, the buffer depth is greater than the first threshold (205), then a delay (206) is introduced. When the delay (206) expires, the current time (203) is updated and the buffer depth (204) is again calculated. Then, dependent upon the buffer depth the next action is determined, and the process continues as earlier described. The delay (206) allows the buffer to transmit at least some of its contents reducing the buffer depth. A typical value for the delay (206) is 45 milliseconds.

With the prior art method, when a change in the input signal source (110) occurs during the call, and an information packet is not received from the new input signal source before the next launch time expires, the comparator provides a filler packet to the buffer. The comparator continues to provide filler packets until such time when an information packet is received from the new source and the information packet is transmitted. Due to the uncontrolled number of filler packets provided by the comparator a significant delay is caused when the filler packets are transmitted on the radio channel before the information packet is transmitted.

The present invention provides a method of determining the depth of a remote buffer, and transmitting information packets to the buffer dependent upon the depth of the remote buffer. With such a method, when a change in input signal source occurs during the call, the filler packets will only be provided dependent upon buffer depth such that a controlled amount of delay is allowed in the transmission of information packets.

We claim:

1. A method, comprising the steps of:

at a simulcast communications system comparator located at a first location:

providing a plurality of information packets to be transmitted by at least one radio base station that has a buffer and that is located remotely from the first location;

determining at the comparator, and independent of any information transmitted from the at least one radio base station, at least one status condition of the buffer;

determining a particular transmission time to transmit a particular information packet from the comparator to the buffer as a function of the at least one status condition.

2. The method of claim 1, wherein the step of providing a plurality of information packets includes the steps of:

receiving a plurality of information packets from at least one remote source;

providing at least some information packets locally.

3. The method of claim 2, wherein the step of providing at least some information packets locally includes the steps of:

receiving at least some system control information from at least one remote source;

formatting at least some of the system control information into an information packet.

4. The method of claim 1, wherein the at least one status condition of the buffer comprises a calculated current depth of the buffer.

5. A method, at a simulcast communications system comparator located at a first location, comprising the steps of:

providing a plurality of information packets to be transmitted by at least a first and a second radio base station, wherein the first radio base station has a first buffer and the second radio base station has a second buffer, and wherein at least one of the first and second radio base stations is located remotely from the first location;

determining at the comparator, and independent of any information transmitted from the first and second base stations, at least one status condition of at least one of the first and second buffers;

determining a particular transmission time to transmit a particular information packet from the comparator to the first and second buffers as a function of the at least one status condition.

6. The method of claim 5, wherein the at least one status condition comprises a calculated current depth of a selected buffer.

7. The method of claim 6, wherein the calculated current depth of the selected buffer represents a calculated period of time that will be required to fully transmit all present contents of the selected buffer.

8. A method, at a simulcast communications system comparator located at a first location, comprising the steps of:

providing information regarding current time;

providing information to be transmitted by at least a first and a second radio base station, wherein the first radio base station has a first buffer and the second radio base station has a second buffer, and wherein at least one of the first and second radio base stations is located remotely from the first location;

determining at the comparator a launch time at which the first and second radio base stations are to transmit a particular information packet;

determining at the comparator, as a function of the current time and the launch time, at least a calculated period of time that will be required to fully transmit all present contents of at least a selected one of the first and second buffers;

determining a particular transmission time to transmit the particular information packet from the comparator to the first and second buffers as a function of the calculated period of time;

providing the particular information packet, which particular information packet includes information representing the launch time;

transmitting to at least the first and second buffers the particular information packet.

* * * * *